No. 651,118. Patented June 5, 1900.
F. PASCAL & L. IZERABLE.
ROLL HOLDING CAMERA.
(Application filed Apr. 5, 1899.)
(No Model.)
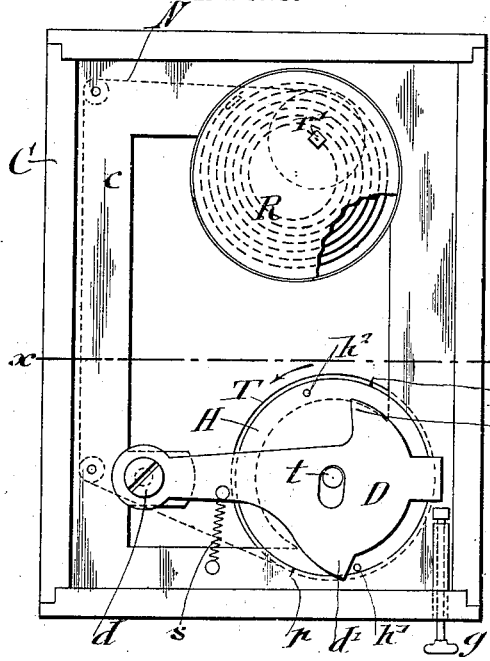
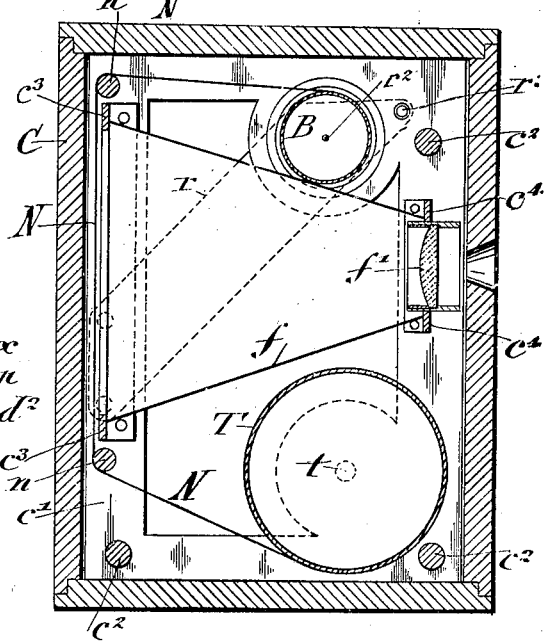
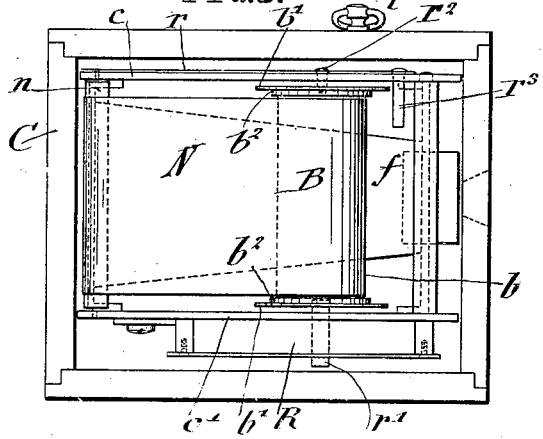
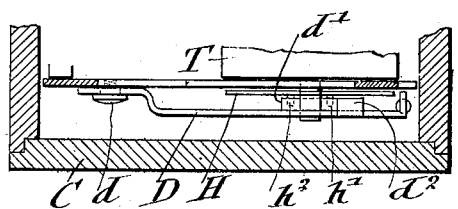
WITNESSES:
INVENTORS
François Pascal and Louis Izerable
BY
ATTORNEYS

UNITED STATES PATENT OFFICE.

FRANÇOIS PASCAL AND LOUIS IZERABLE, OF LYONS, FRANCE.

ROLL-HOLDING CAMERA.

SPECIFICATION forming part of Letters Patent No. 651,118, dated June 5, 1900.

Application filed April 5, 1899. Serial No. 711,799. (No model.)

*To all whom it may concern:*

Be it known that we, FRANÇOIS PASCAL and LOUIS IZERABLE, both of Lyons, France, have invented certain new and useful Improvements in Photographic Apparatus, of which the following is a specification.

This invention relates to a photographic apparatus of the class known as "snap-shot"— that is to say, having for its object the automatic and successive taking of a series of views or pictures on sensitized films.

The features which differentiate this apparatus from other similar snap-shot are, first, a device whereby after exposure the sensitized band or film is automatically brought back onto the original bobbin to its former position; second, mechanism enabling the shifting of films required for taking each picture to be automatically effected by merely pushing a knob, and, third, the use for the above purpose of special bobbins, which, while allowing the insertion of the bobbin into the apparatus in full daylight, also protect the sensitized film in a more efficient manner than has been done by the bobbins hitherto used.

In order that our invention may be better understood and more readily carried into effect, we will describe it with reference to the accompanying drawings, on which—

Figure 1 represents a side view of the camera with the side of the outer case removed; Fig. 2, a vertical section of the same through the center; Fig. 3, a plan with the top of the case removed, and Fig. 4 a partial section along line $x\,x$ of Fig. 1.

The camera consists of an outer case C, containing the mechanism, which is mounted upon a frame consisting of the open side frames $c\,c'$, connected by stay-bars $c^2$ and the cross-stays $c^3$ and $c^4$, supporting the screening-funnel $f$ and lens $f'$.

The device allowing the film to be automatically brought back after exposure onto the original bobbin, from which it has been previously unwound, consists, essentially, of—

First. A bobbin B, upon which is wound up the sensitized band or film intended to receive the successive impressions or pictures. The bobbin may be easily inserted and removed from the apparatus and is held at one side by a square rod, forming the prolongation of the axis $r'$ of a spring, hereinafter referred to, and at the other side by a short pivot $r^2$, fixed to a resilient blade $r$, Figs. 2 and 3, which is deflected by pressing on the pin $r^3$, riveted to the blade, when the bobbin is to be removed from the apparatus.

Second. A coiled spring in a case R, fixed to the side frame $c'$, the axis $r'$ of which carries a square projection entering one of the sides of the bobbin, this spring being coiled in such a manner that when the film is drawn off the bobbin the spring is placed under tension.

Third. Two rollers $n\,n$, over which the sensitized film N passes and which hold the latter in the focal plane of the object-glass or lens $f'$.

Fourth. A cylinder T, to which is fastened one end of the sensitive band or film N, and the periphery of which may be equal to or a multiple of that of the bobbin. (The same is shown to be double that of the bobbin in the drawings, and this seems to be the most suitable size for small views.) Upon this cylinder T are fixed, at two diametrically-opposite points $p$, two triangular blades or their equivalents, which are employed for the purpose of perforating the film at distances which are equal to the length of a negative. Their position is regulated in such a manner that the perforation may fall between two views or pictures. The axis $t$ of this cylinder extends outside the apparatus and is terminated by a knob $t'$. When the cylinder is turned by means of the knob in the direction indicated by the arrow on Fig. 1, the film is wound upon the drum T and perforated, the film causing the bobbin to turn and the spring to be contracted. When the whole film has passed from the bobbin B onto the cylinder T, the apparatus is ready to operate. In this position the band would return under the action of the spring suddenly and entirely upon the original bobbin; but the mechanism hereinafter described has for its object to control this return motion in such a manner that it shall only take place fractionally and successively and at the required moment.

The mechanism for changing the film comprises a metallic disk H, securely fixed to the axis of the cylinder T and turning therewith. This disk carries, near the edge and diametrically opposite, two pins $h'\,h^2$; also, an oscillating piece or lever D, actuated by the outer knob or push $g$ whenever pressed and brought back to its former position by a spring $s$ as soon as the said knob is released. This piece is hinged at $d$ and arranged parallel to the disk and bent out or placed at a sufficient distance therefrom, as shown in Fig. 4, to allow for the passage of the pins $h'$ and $h^2$; but it is provided with two laterally-projecting stop-pieces $d'$ and $d^2$, the form and arrangement of which are such as to allow the drum to turn continuously in the direction indicated by the arrow, but only intermittently in a reverse direction, whenever the piece D is caused to oscillate.

The oscillation imparted by pressing the outer knob $g$ has for its object to release from its stop-piece $d'$ the pin $h'$, which impeded the motion of the drum, so that the latter starts rotating, but is almost immediately stopped by the second pin $h^2$ abutting against the other stop-piece $d^2$. As soon as the knob $g$ is released the piece D returns to its normal position. The second pin $h^2$ is likewise released and allows the drum to rotate until this pin has met the opposite stop-piece $d'$. The complete to-and-fro oscillation of the piece D has for its object to allow the drum to accomplish half a revolution by means of two successive movements. The length of film which has been automatically unwound during this half-revolution corresponds, as already stated, to one picture or negative.

The bobbin B has a special shape which is different to those heretofore used and thoroughly protects the sensitized layer from the action of the light. This bobbin comprises a cylinder $b$, Fig. 3, of wood or other suitable material, the circumference of which is equal to the length of a negative. The ends or cheeks are formed by metallic disks $b'$, centrally perforated, one having a square opening, wherein is introduced the end of the spindle $r'$ of the spring which has to turn the bobbin B, while the other has a round opening, through which passes the end of the peg $r^2$ which holds the bobbin in the apparatus. Between each of the cheeks and the cylinder we arrange a cheek-piece $b^2$, having a thickness of about one millimeter and forming a rabbet. This piece is made of metal, cardboard, or wood and fixed to the cylinder. The diameter of this cheek-piece is smaller than that of the cheek and is equal to that of the cylinder formed by the sensitized film wound upon the bobbin B.

The distance between the cheek-pieces $b^2$ is equal to the width of the film, and the distance between the checks is equal to the width of the opaque paper which terminates the film, so that after the winding of the film between the cheek-pieces the wider black paper, the edges of which are in contact with the cheeks, effects a closure and stops the action of the light.

Having thus described our invention, what we claim is—

1. In a photographic camera of the "snapshot" class, the combination, with the original bobbin on which the film is to be rewound after use, of means for unwinding the film from said bobbin, and means for automatically returning a portion of the film onto the said bobbin after the taking of each picture, substantially as set forth.

2. In a photographic camera of the "snapshot" class, the combination, with a bobbin on which the film is to be wound after use, of a spring-actuated pivot-pin, a suitably-mounted squared shaft or axis, a tension-spring tending to rotate said shaft and to wind up the film on the bobbin, said bobbin being connected with said shaft and bearing on said pivot-pin, and means for releasing the film and permitting said spring to act, substantially as set forth.

3. In a photographic camera of the "snapshot" class, the combination, with the original bobbin on which the film is to be wound after use, a tension device acting on said bobbin, and a drum fixed permanently in position and around which the other end of the film is wound when the same is in using position, of means for rotating said drum in one direction for unwinding the film, and means for imparting a partial rotation, only, to said drum in opposite direction, substantially as set forth.

4. In a photographic camera of the "snapshot" class, the combination of a tension device, a bobbin on which the film or band is wound, means for winding said film or band for placing said bobbin under tension, and means for returning the film or band to said bobbin, substantially as set forth.

5. In a photographic camera of the "snapshot" class, the combination of a tension device, a bobbin detachably connected with and subject to the action of said tension device and on which bobbin the film is wound, a drum mounted permanently in position and to which the said film or band is applied, means for freely turning said drum in one direction for winding said film or band thereon, and means acting on said drum for releasing the film and permitting said tension device to act, so as to return the film to original position, substantially as set forth.

6. In a photographic camera of the "snapshot" class, the combination of a spring-actuated bobbin, on which the film is wound, a drum upon which said film is also wound, diametrically-opposite pins projecting from one end of said drum, a stop device constructed to permit the drum to rotate freely in one direction and adapted to be engaged alternately by said pins to stop the movement of the drum in opposite direction, and means for actuating said stop device for releasing the pins therefrom, substantially as set forth.

In testimony that we claim the foregoing as our invention we have signed our names in presence of two subscribing witnesses.

F. PASCAL.
LOUIS IZERABLE.

Witnesses:
J. BURMAT,
J. B. ROSSIGNOL.